Aug. 25, 1959     W. B. EASTMAN ET AL     2,900,944
METHOD OF AND APPARATUS FOR APPLYING BONDING
SOLDER TO CAN BODY SIDE SEAMS
Filed Oct. 17, 1955

INVENTORS
Willard B. Eastman, &
Philip F. Catalano.
By
Mason, Porter, Diller & Stewart
ATTORNEYS

United States Patent Office 2,900,944
Patented Aug. 25, 1959

2,900,944

METHOD OF AND APPARATUS FOR APPLYING BONDING SOLDER TO CAN BODY SIDE SEAMS

Willard B. Eastman, La Grange, and Philip F. Catalano, Chicago, Ill., assignors to Continental Can Company, Inc., New York, N.Y., a corporation of New York Application October 17, 1955, Serial No. 540,686

11 Claims. (Cl. 113—60)

The invention relates generally to the art of making cans and primarily seeks to provide a novel method of and apparatus for applying bonding solder to the side seams of can bodies.

In the now conventional practice of making cans the can bodies are shaped up from blanks in a bodymaker, marginal edge portions being brought together in a longitudinal side seam formation, and the bodies are fed in processional order and in the direction of their axes through a soldering station where molten solder is applied to the side seams to securely bond the same. This solder applying action customarily is accomplished by a long generally cylindrical roll disposed in parallel relation to the travelling can bodies and which picks up molten solder from a solder bath and applies the same to the can body side seams passing thereover. This practice presents many operating problems which should be overcome.

Many of the problems result from the necessity of employing a very long solder roll and a very large pot in which to retain the necessarily large bath of molten solder. A relatively large amount of flux or roll salt is employed in order to assure, insofar as is possible, transfer of clean solder to the can body seams, and the radiation of heat from the pot and molten solder and boiling of flux into the surrounding atmosphere provides extremely unpleasant working conditions for operating personnel, not to speak of rapid machine part deterioriation in adjacent portions of the side seamer.

It is also well know that this solder roll method of bonding solder application results in application of a greater amount of solder than is necessary to accomplish an efficient seam bonding, providing a solder cut much wider than is desirable and also necessitating a wiping away of the surplus of applied solder at a station beyond the soldering station. This wiping away of surplus solder also presents a very serious problem because in its accomplishment a rapidly rotated wiper roll customarily is employed with the result that small pellets of solder are at time thrown off by the wiper roll and enter and adhere in can bodies passing through the wiping station.

A purpose of the present invention is to provide a novel method and apparatus which will solve the problems enumerated hereinabove by enabling the use of a very small solder pot, thus greatly reducing heat radiation by greatly reducing the amount of flux or roll salt necessary to be used, and by applying the solder directly to the entrance into the can body side seams in the form of a narrow stripe or body of solder moving approximately at the same speed as the engaging can bodies, thus substantially eliminating wastage of solder and also the prior necessity of employing surplus solder wiper rolls.

An object of the invention is to provide a novel method of the character stated and comprising, rotating a body having a narrow peripheral edge in an upright plane in a bath of molten solder at such a speed as to present by centrifugal force at the upper crown of said edge a thick film of molten solder, and moving can bodies in processional order and in the direction of their axes with their side seams aligned to present the seam entrances in tangential relation to said film and contacting the film without contacting said edge.

Another object of the invention is to provide a method of the character stated wherein the can bodies are moved at a lineal speed approximately the same as the peripheral speed of the film carrying peripheral edge.

Another object of the invention is to provide a novel method of the character stated wherein the peripheral speed of the film carrying edge is at least as great as the lineal speed of the traveling can bodies.

Another object of the invention is to provide an apparatus of the character stated and including means for feeding can bodies in the direction of their axes and in processional order with their side seams aligned, and means for applying seam bonding solder in a narrow line along the entrance into each travelling side seam and comprising a solder pot having a bath of molten solder therein, a solder applying rotor uprightly disposed in the bath and having a smooth continuous periphery projecting above the bath into closely spaced but out-of-contact relation to the can body seams passing thereover, and means for rotating the rotor at a speed for presenting by centrifugal force a thick film of molten solder for contact with the passing side seams along the entrance thereinto.

Another object of the invention is to provide an apparatus of the character stated wherein the rotor has a narrow, well rounded peripheral edge effective to carry a solder film which is generally crescent shape in cross section.

Another object of the invention is to provide an apparatus of the character stated wherein the rotor is disposed in a vertical plane through which the can body axes pass and is carried by a shaft traversing the pot as a dam across the top of the bath and preventing free communication at the bath level between the bath surface at the down going side of the rotor and the bath surface at the up going side of the rotor.

A further object of the invention is to provide an apparatus of the character stated wherein the can body feeding means and the means for rotating the rotor are correlated so that the can bodies are moved at a lineal speed approximately the peripheral speed of the rotor.

A still further object of the invention is to provide an apparatus of the character stated wherein the can body feeding means and the means for rotating the rotor are correlated so that the peripheral speed of the rotor will be at least as great as the lineal speed of the can bodies.

With the above and other objects in view that will hereinafter appear, the nature of the invention will be more clearly understood by reference to the following detailed description, the appended claims and the several views illustrated in the accompanying drawing.

Figure 1:
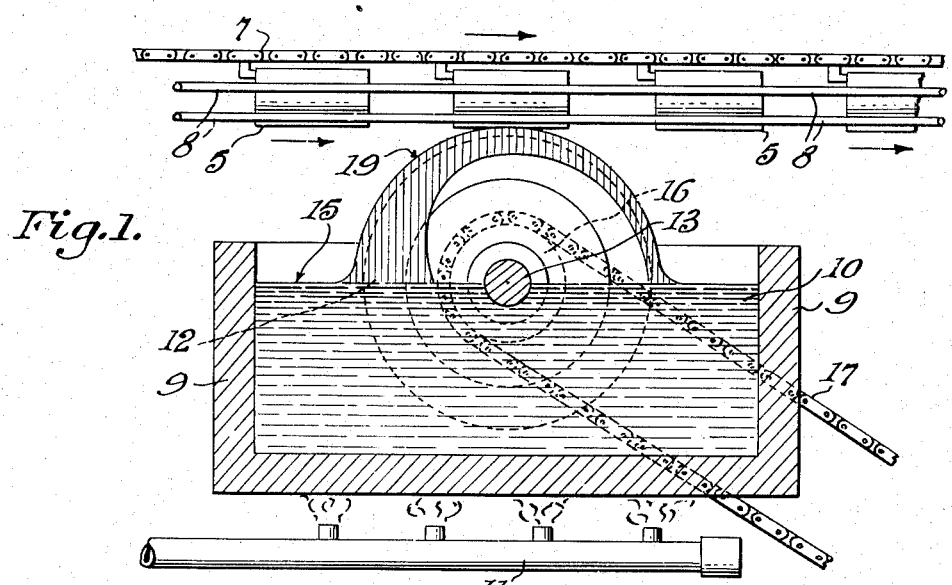
Figure 1 is a somewhat diagrammatic vertical longitudinal sectional view illustrating the invention.

In the example of the embodiment of the invention herein illustrated, the can bodies 5 formed in conventional manner and including the side seams 6 are fed in processional order and with their side seams aligned by conventional feed means generally designated 7, the can bodies being supported by a suitable horse 8 as they are being fed. In this example illustration, a skeleton horse is somewhat diagrammatically indicated, but it is to be understood that any suitable horse structure or can body guiding and placing means may be employed.

At the station at which the can body side seams are to be solder bonded, a smaller solder pot 9 is positioned, and a solder bath 10 is maintained therein and kept in molten state by suitable heating means generally designated 11.

A solder applying rotor 12 rotates in a vertical plane through which the axes of the travelling can bodies pass, and the rotor is mounted on a shaft 13 which is disposed transversely of the solder pot and is rotatable in bearings 14 provided therefor in the pot. The shaft 13 is disposed at the level of the bath or across the top surface 15 therein so as to constitute a dam separating the downgoing side of the rotor, or the right hand side as viewed in Figure 1, from the up going side of said rotor. The shaft 13 is equipped with a sprocket 16 which is driven through transmission means 17 from a driving part of the side seamer in which the apparatus is incorporated, or from any other suitable power source, such as an individual motor (not shown).

Figures 2, 3:
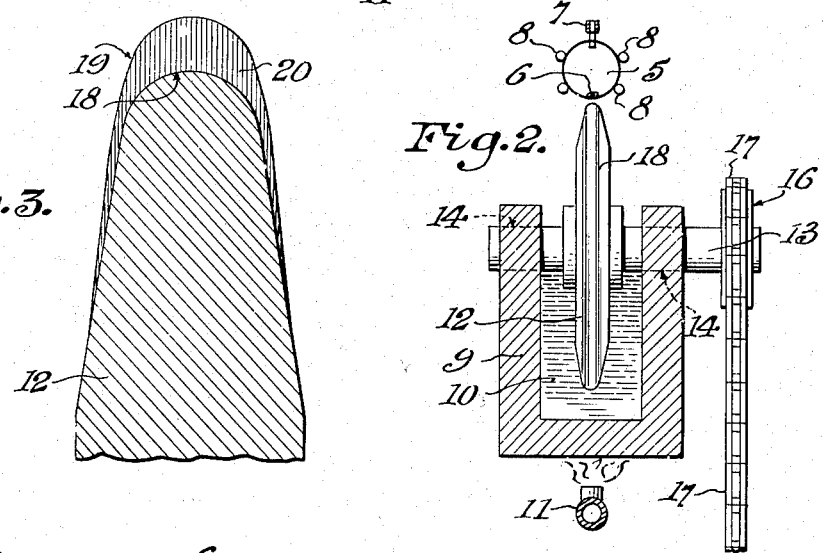
Figure 2 is a vertical cross section illustrating the parts shown in Figure 1.
Figure 3 is an enlarged fragmentary sectional view illustrating the peripheral portion of the molten solder applying rotor with the film of solder carried thereon.

The rotor 12 is equipped with a well rounded, narrow peripheral edge 18, and as it is rotated in the solder bath 10 it will pick up and carry a film of the molten solder, this film being presented by the action of centrifugal force in the form of a thick but narrow film over the upper crown portion of the rotor, or the portion thereof extending without the bath as shown in Figure 1, this film being generally crescent shaped in cross section as illustrated at 20 in Figure 3.

Figure 4:
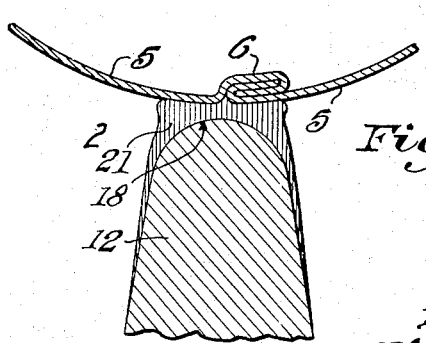
Figure 4 is a view similar to Figure 3 but with a can body side seam engaging over the rotor carried film and illustrating how the rotor provides not only a film carrying curface but also a smooth continuous backup surface which aids in forcing the solder into the seam entrance as the seam engages and breaks the surface tension of the solder film.

It will be apparent by reference to Figures 1 and 4 of the drawings that the solder applying wheel is so placed with relation to the can body supporting device and the can bodies which pass individually in tangential relation over the rotor that the peripheral surface of the rotor passes adjacent but always out of contact with the can body side seams, the centrifugal force presented film 19 engaging as a continuous and moving body with the can body side seams. The peripheral surface 18 of the solder applying rotor provides a smooth continuous backup surface, and when each can body side seam engages the continuous and rotating film 19 with the seam entrance in tangential relation and centered over the film, the film will be deformed in the manner indicated at 21 in Figure 4, and the backup surface serves to assure against any deformation or displacement of the film inwardly toward the rotor axis and therefore serves as the surface tension of the film is broken by seam contact to assure that the molten solder will enter the seam entrance to efficiently run by capillary action into all portions of the side seam structure. By this means of application of the solder to the can body side seams, the solder is applied in a very narrow stripe and substantially without surplus, and therefore the provision of a solder cut which is narrow and neat in appearance, and which renders unnecessary the customary subsequent surplus solder wiping step is assured.

It is to be understood that the diameter of the solder applying wheel and the rate of rotation or peripheral speed of said wheel is selected in accordance with the lineal speed at which the can bodies are to be fed. In other words, the can body feeding means and the means for rotating the rotor are correlated so that the can bodies are moved at a lineal speed approximating the peripheral speed of the rotor. Preferably, this driving correlation is governed so as to assure that the rotor is driven at a peripheral speed at least as great as the lineal speed of the travelling can bodies. This not only assures proper application of the bonding solder film to the side seams, but also assures against cutting of the can body ends into the solder film. It is to be understood also that the rotor diameter and the speed of rotation applied thereto must be so correlated with each other and with the lineal path of the travelling cans as to assure the desired film of bonding solder will be presented at the peripheral edge of the rotor over which the can bodies pass without any danger of the solder being thrown off into space.

By reason of the particular nature and placement of the solder applying rotor a very small solder pot can be used and thus there is great reduction in the amount of radiated heat and in the amount of flux or roll salt necessary to be used. Moreover, placement of the rotor shaft 13 is a dam across the level 15 of the solder bath 10 serves to separate floating flux or foreign matter at the down going side of the rotor (at the right in Figure 1) from the up going side of the rotor which picks up the clean solder and applies it in the form of a moving film to the can bodies in the manner previously described.

It will be apparent, of course, that the basic method steps, structures and solder applying rotor shape herein disclosed, and the driving speeds may be varied so long as the herein described basic requirements are met within the spirit and scope of the invention defined in the appended claims.

We claim:

1. The herein described method of applying solder to can body side seams which comprises rotating in a vertical longitudinal plane and in a molten solder bath a body presenting a smooth continuous and narrow surface of rotation, said rotation being at such a speed as to present a thick film of the molten solder at the periphery of said surface, and moving a can body in the direction of its axis and with said axis in said vertical plane of said rotation and in such position as to present the can body seam entrance in tangential relation to said surface of rotation and in contact with said film but out of contact with said surface.

2. The herein described method of applying solder to can body side seams which comprises rotating in a vertical longitudinal plane and in a molten solder bath a body presenting a smooth continuous and narrow surface of rotation, said rotation being at such a speed as to present a thick film of the molten solder at the periphery of said surface, and moving a can body at a lineal speed approximating the peripheral speed of said surface of rotation and in the direction of its axis and with said axis in said vertical plane of said rotation and in such position as to present the can body seam entrance in tangential relation to said surface of rotation and in contact with said film but out of contact with said surface.

3. The herein described method of applying solder to can body side seams which comprises rotating a body having a narrow well rounded peripheral edge in an upright plane in a bath of molten solder at such a speed as to present by centrifugal force at the upper crown of said surface a thick film of molten solder having an upwardly arched cross section, and moving can bodies in processional order and in the direction of their axes with their side seams aligned to present the seam entrances in tangential relation to said film and contacting the film without contacting said surface.

4. The herein described method of applying solder to can body side seams which comprises rotating a body having a narrow well rounded peripheral edge in an upright plane in a bath of molten solder at such a speed as to present by centrifugal force at the upper crown of said surface a thick film of molten solder having an upwardly arched cross section, and moving can bodies in processional order and in the direction of their axes with their side seams aligned to present the seam entrances in tangential relation to said film and contacting the film without contacting said surface, the peripheral speed of said surface being at least as great as the lineal speed of the can bodies.

5. The herein described method of applying solder to can body side seams which comprises, feeding the can bodies in the direction of their axes and with their side seams aligned one with another, and applying molten solder to each passing seam entrance in the form of a continuous narrow but thick film presented by centrifugal force at the periphery of a continuous narrow surface of rotation to which molten solder is applied and rotating in an upright plane in which said can body axes lie, said surface being spaced from the moving can body side seams to assure against direct contact with the can bodies but serving to provide a continuous and solid back up for the film where it is being contacted by a can body side seam and being rotated at a peripheral speed at least as great as the lineal speed of the can bodies moving thereover.

6. In apparatus of the character described, the combination of means for feeding can bodies in the direction of their axes and in processional order with their side seams aligned one with another, and means for applying seam bonding solder in a narrow line along the entrance into each travelling side seam, said last named means comprising a solder pot having a bath of molten solder therein, a solder applying rotor uprightly disposed in the bath and having a smooth continuous periphery projecting above the bath into closely spaced but out-of-contact relation to the can body seams passing thereover, and means for rotating the rotor at a speed for presenting by centrifugal force a thick film of molten solder for contact with the passing side seams along the entrances thereinto.

7. Apparatus as defined in claim 6 wherein the rotor is disposed in a vertical plane through which the can body axes pass and has a smoothly rounded periphery effective to present a bonding solder film having an outwardly arched cross section.

8. Apparatus as defined in claim 6 wherein the rotor is disposed in a vertical plane through which the can body axes pass and has a smoothly convex peripheral edge effective to present a film which is generally crescent shape in cross section.

9. Apparatus as defined in claim 6 wherein the rotor is disposed in a vertical plane through which the can body axes pass and is carried by a shaft traversing the pot as a dam across the top of the bath and preventing free communication at the bath level between the bath surface at the down going side of the rotor and the bath surface at the up going side of the rotor.

10. Apparatus as defined in claim 6 wherein the can body feeding means and the means for rotating the rotor are correlated so that the can bodies are moved at a lineal speed approximating the peripheral speed of the rotor.

11. Apparatus as defined in claim 6 wherein the can body feeding means and the means for rotating the rotor are correlated so that the peripheral speed of the rotor will be at least as great as the lineal speed of the can bodies.

References Cited in the file of this patent

UNITED STATES PATENTS

| | | |
|---|---|---|
| 1,935,646 | Luthi | Nov. 21, 1933 |
| 1,956,345 | Coyle | Apr. 24, 1934 |
| 1,974,641 | Burns | Sept. 25, 1934 |